(12) United States Patent
Tsai

(10) Patent No.: US 9,139,044 B1
(45) Date of Patent: Sep. 22, 2015

(54) CASTOR BRAKING AND STOPPING ROTATING SIMULTANEOUSLY

(71) Applicant: Po-Chuan Tsai, Tainan (TW)

(72) Inventor: Po-Chuan Tsai, Tainan (TW)

(*) Notice: Subject to any disclaimer, the term of this patent is extended or adjusted under 35 U.S.C. 154(b) by 0 days.

(21) Appl. No.: 14/305,026

(22) Filed: Jun. 16, 2014

(51) Int. Cl.
*B60B 33/02* (2006.01)
*B60B 33/00* (2006.01)

(52) U.S. Cl.
CPC ........... *B60B 33/021* (2013.01); *B60B 33/0081* (2013.01); *Y10T 16/195* (2015.01)

(58) Field of Classification Search
CPC ... Y10T 16/18; Y10T 16/184; Y10T 16/1857; Y10T 16/186; Y10T 16/195; B65D 90/18; B60B 33/0039; B60B 33/0078; B60B 33/0081; B60B 33/0086; B60B 33/02; B60B 33/021; A45C 5/145
USPC ....... 16/18 R, 45, 48, 20, 35 R; 188/1.12, 69; 301/6.1
See application file for complete search history.

(56) References Cited

U.S. PATENT DOCUMENTS

| | | | | |
|---|---|---|---|---|
| 4,248,445 A * | 2/1981 | Vassar | .......... | 280/79.11 |
| 4,349,937 A * | 9/1982 | Fontana | .......... | 16/35 R |
| 5,303,450 A * | 4/1994 | Lange | .......... | 16/35 D |
| 6,810,560 B1* | 11/2004 | Tsai | .......... | 16/35 R |
| 8,220,110 B1* | 7/2012 | Chen | .......... | 16/35 R |
| 8,302,257 B2* | 11/2012 | Lin | .......... | 16/35 R |
| 8,499,413 B1* | 8/2013 | Tsai | .......... | 16/35 R |
| 8,850,657 B1* | 10/2014 | Yang | .......... | 16/35 R |
| 2007/0119661 A1* | 5/2007 | Chang | .......... | 188/1.12 |
| 2009/0038113 A1* | 2/2009 | Yan | .......... | 16/39 |
| 2009/0139804 A1* | 6/2009 | Lin | .......... | 188/1.12 |
| 2012/0255141 A1* | 10/2012 | Lin et al. | .......... | 16/45 |
| 2013/0212834 A1* | 8/2013 | Chen | .......... | 16/45 |
| 2015/0096845 A1* | 4/2015 | Lin | .......... | 188/1.12 |

\* cited by examiner

*Primary Examiner* — William Miller
(74) *Attorney, Agent, or Firm* — Alan D. Kamrath; Kamrath IP Lawfirm, P.A.

(57) ABSTRACT

A castor includes a castor body, an operation unit connected with the castor body, a locking unit connected with the castor body, a roller mounted on the castor body, and a mandrel extended through the castor body and the roller. Thus, when the castor is locked completely, the roller is entirely locked by the locking unit so that the roller cannot roll and translate and cannot be turned around simultaneously so as to provide a double-braking effect. In addition, when the castor is locked partially, the roller is partially locked by the locking unit so that the roller cannot be turned around but can roll and translate freely.

7 Claims, 7 Drawing Sheets

CASTOR BRAKING AND STOPPING ROTATING SIMULTANEOUSLY

BACKGROUND OF THE INVENTION

1. Field of the Invention

The present invention relates to a wheeled vehicle and, more particularly, to a castor for a cart, chair and the like.

2. Description of the Related Art

A conventional castor in accordance with the prior art shown in FIGS. 1 and 2 comprises a fixed tube 11, a castor body 12 swivelably mounted on the fixed tube 11 and having an interior provided with a retaining hole 121, a first engaging member 122 mounted on the castor body 12, a control rod 113 movably mounted in the fixed tube 11 and extended through the castor body 12, a bushing 114 mounted between the fixed tube 11, the castor body 12 and the control rod 113, a second engaging member 1141 mounted on a mediate of the control rod 113, a roll 1131 mounted on a top of the control rod 113, a retaining block 116 mounted on a lower end of the control rod 113, a push block 1132 mounted on a bottom of the control rod 113, a cam 112 rotatably mounted in the fixed tube 11 and having a periphery provided with a first ear 1121 and a second ear 1122 which are movable to press the roll 1131, an operation handle 111 extended through the cam 112 to rotate the cam 112, two rollers 13 rotatably mounted on two opposite sides of the castor body 12 and each having a side provided with a plurality of locking grooves 131, an elastic unit 115 mounted between the control rod 113, the bushing 114, the second engaging member 1141 and the retaining block 116 to provide a restoring effect to the control rod 113, and a braking unit 117 mounted on the castor body 12. The braking unit 117 includes a slide 1172 movably mounted on the castor body 12 and a braking rod 1171 connected with the slide 1172. The slide 1172 has a side provided with a ramp 1173 aligning with the push block 1132.

In operation, when the cam 112 is rotated by the operation handle 111 in a first direction, the first ear 1121 of the cam 112 is movable to press the roll 1131 as shown in FIG. 2. In such a manner, the roll 1131 is moved downward to press and move the control rod 113 which moves the retaining block 116 so that the retaining block 116 is extended into and locked in the retaining hole 121 of the castor body 12 to lock the castor body 12. Thus, the castor body 12 is locked by the control rod 113 and cannot be rotated relative to the fixed tube 11, while each of the rollers 13 can be rotated relative to the castor body 12 freely, so that the castor is moved linearly and cannot be turned around.

Alternatively, when the cam 112 is rotated by the operation handle 111 in a second direction, the second ear 1122 of the cam 112 is movable to press the roll 1131. In such a manner, the roll 1131 is further moved downward to press and move the control rod 113 which moves the second engaging member 1141 so that the second engaging member 1141 is moved to engage the first engaging member 122 to lock the castor body 12. Thus, the castor body 12 is locked by the control rod 113 and cannot be rotated relative to the fixed tube 11. At the same time, when the control rod 113 is moved downward, the push block 1132 is moved by the control rod 113 to abut the ramp 1173 of the slide 1172, so that the slide 1172 is pushed to move the braking rod 1171. In such a manner, the braking rod 1171 is extended into and locked in one of the locking grooves 131 of each of the rollers 13 so as to lock each of the rollers 13. In such a manner, each of the two rollers 13 is locked by the braking rod 1171 and cannot be rotated relative to the castor body 12. Thus, the castor is braked to stop moving and cannot be turned around.

BRIEF SUMMARY OF THE INVENTION

The primary objective of the present invention is to provide a castor that is controlled by an operation handle to brake and stop turning simultaneously so as to provide a double-braking function.

In accordance with the present invention, there is provided a castor comprising a castor body, an operation unit connected with the castor body, a locking unit connected with the castor body, a roller mounted on the castor body, and a mandrel extended through the castor body and the roller. The castor body has an interior provided with a chamber. The operation unit includes a housing, a support tube mounted in the housing, a control shaft mounted in the support tube, a slide connected with an upper end of the control shaft, a first spring mounted on the slide and biased between the slide and the support tube, a pressing member mounted on a top of the slide, a cam block located above the slide and rotatable to press the slide, and an operation handle extended through the housing and the cam block. The control shaft has a lower end extended into the chamber of the castor body and provided with a driving portion. The locking unit includes an elastic braking plate mounted on the castor body, a rivet extended through the castor body and the elastic braking plate, a brake stop block mounted on the control shaft and movable to abut the elastic braking plate, and a second spring biased between the castor body and the elastic braking plate. The elastic braking plate has a first end provided with a braking portion and a second end provided with a mounting portion for mounting the second spring. The elastic braking plate is provided with a pivot portion mounted on the rivet. The elastic braking plate has a side provided with a plurality of locking teeth. The brake stop block has a center provided with a driven hole secured on the driving portion of the control shaft. The brake stop block is located above the elastic braking plate and has a bottom provided with a plurality of toothed grooves.

According to the primary advantage of the present invention, when the castor is locked completely, the roller is entirely locked by the locking unit so that the roller cannot roll and translate and cannot be turned around simultaneously so as to provide a double-braking effect.

According to the primary advantage of the present invention, when the castor is locked partially, the roller is partially locked by the locking unit so that the roller cannot be turned around but can roll and translate freely.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
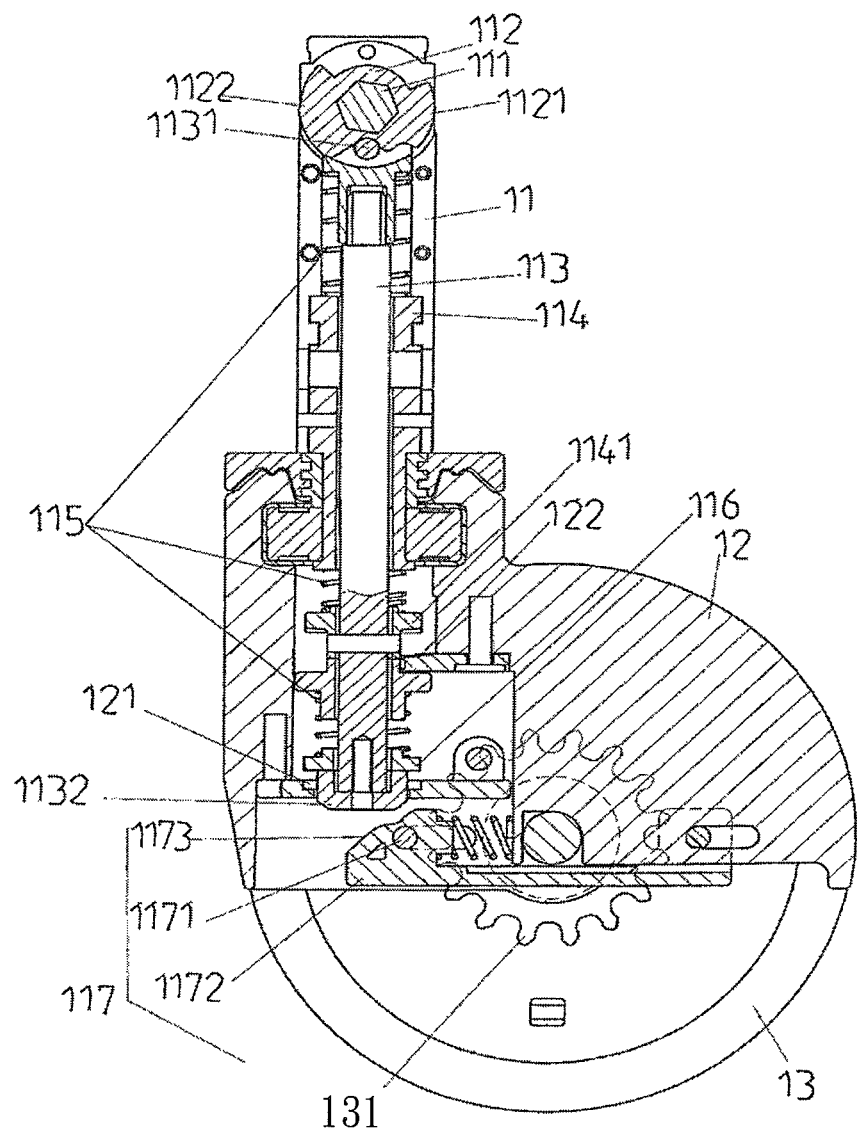
FIG. 1 is a side cross-sectional view of a conventional castor in accordance with the prior art.
Figure 2:
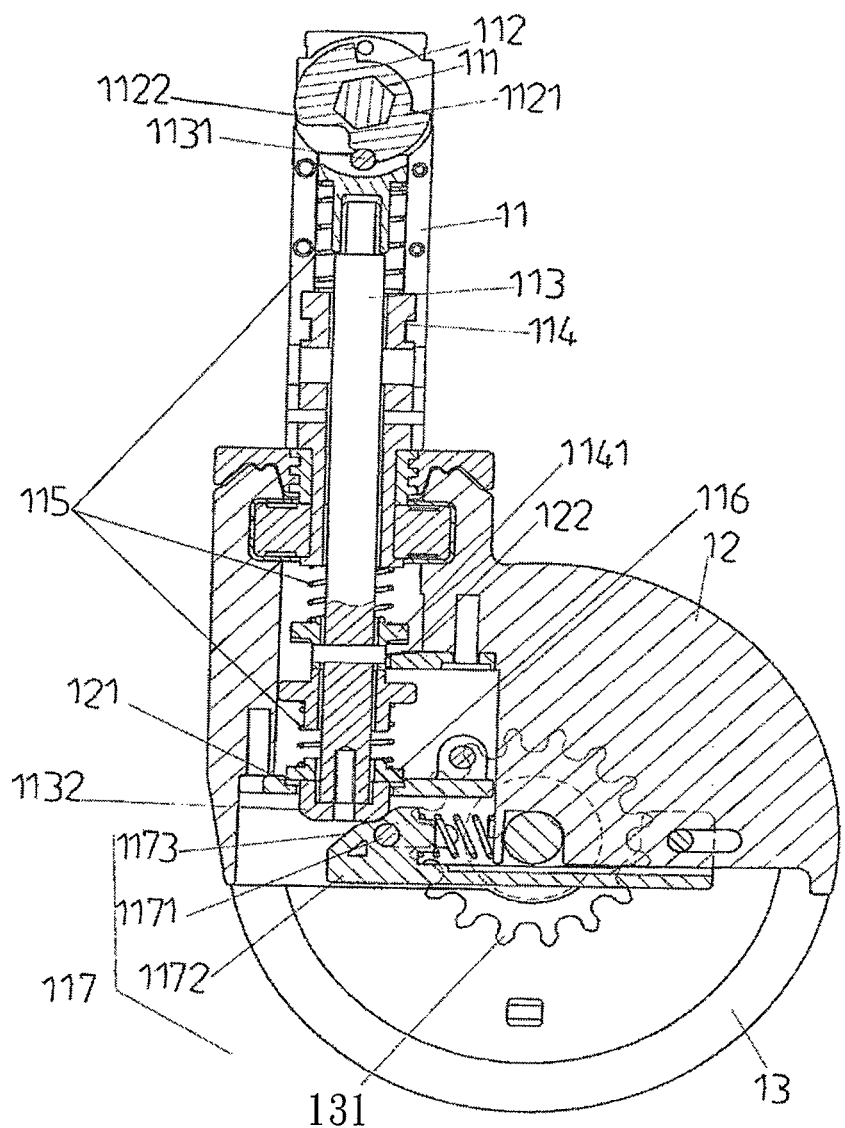
FIG. 2 is a schematic operational view of the conventional castor as shown in FIG. 1.
Figure 3:
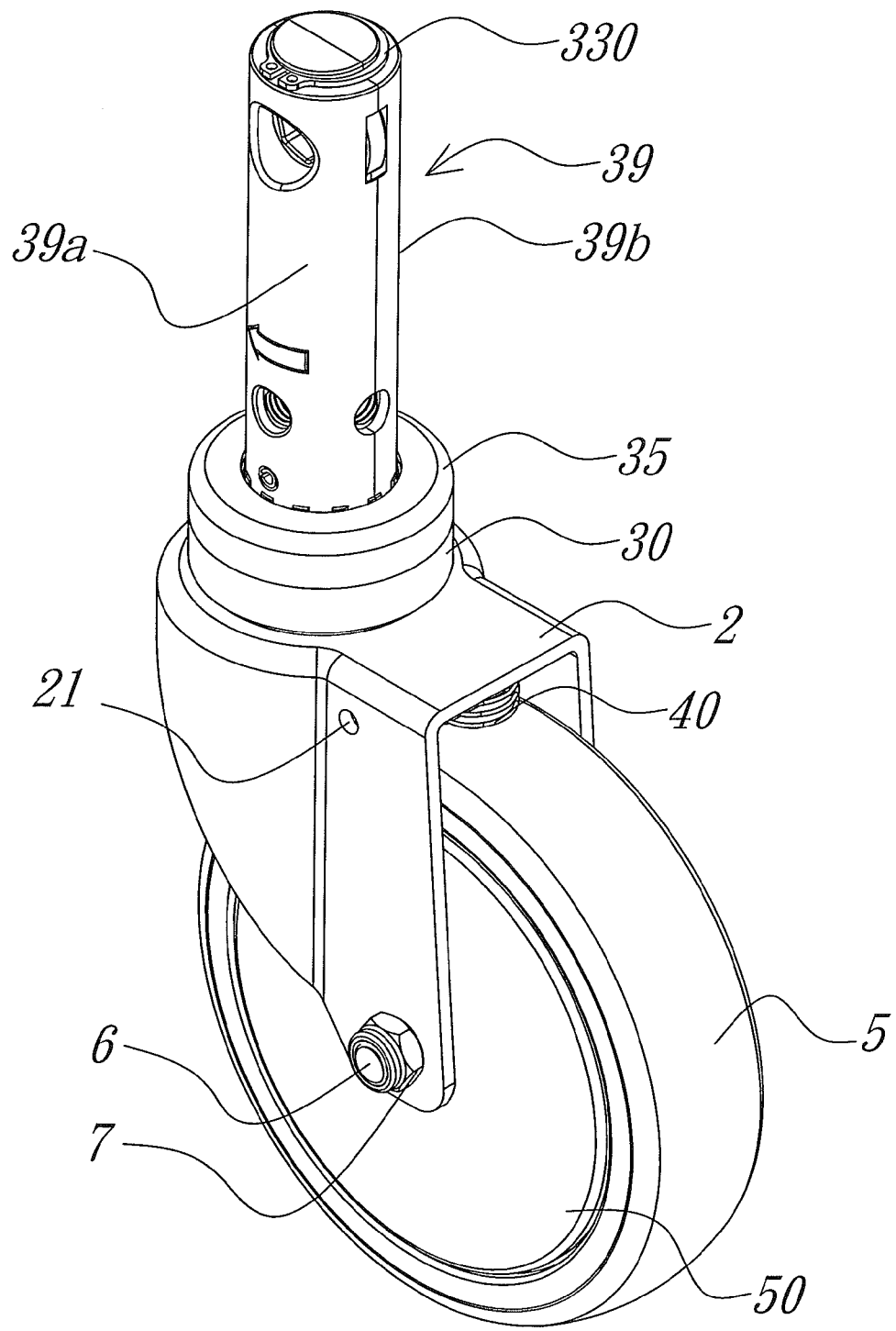
FIG. 3 is a perspective view of a castor in accordance with the preferred embodiment of the present invention.
Figure 4:
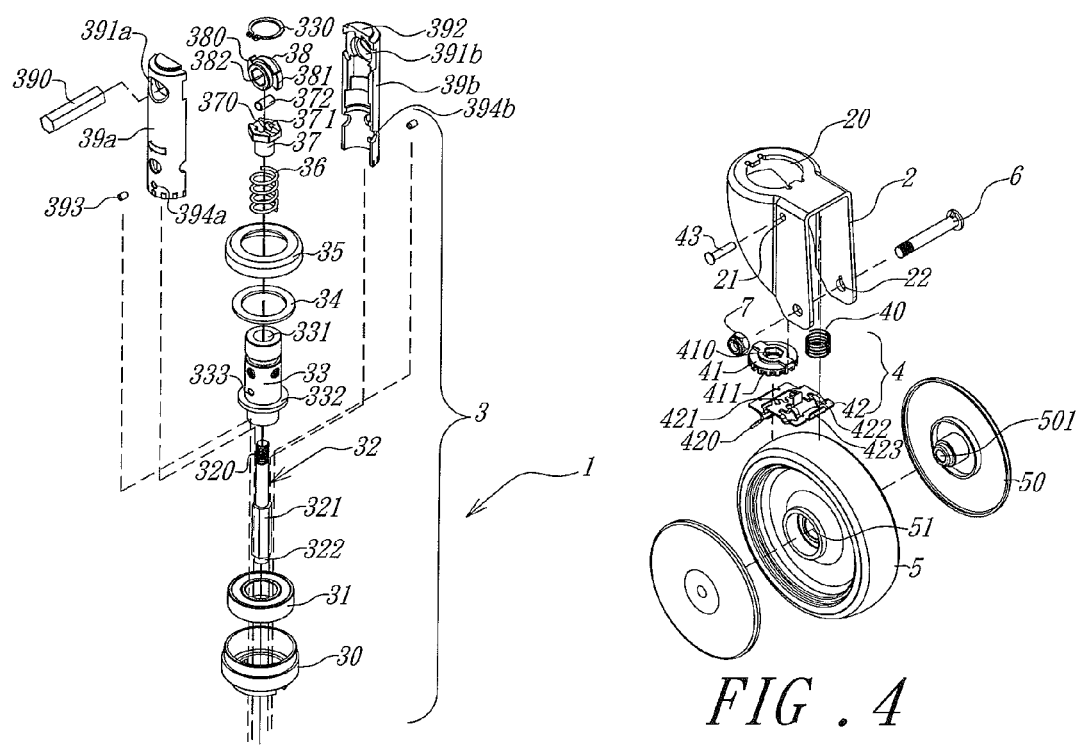
FIG. 4 is an exploded perspective view of the castor as shown in FIG. 3.
Figure 5:
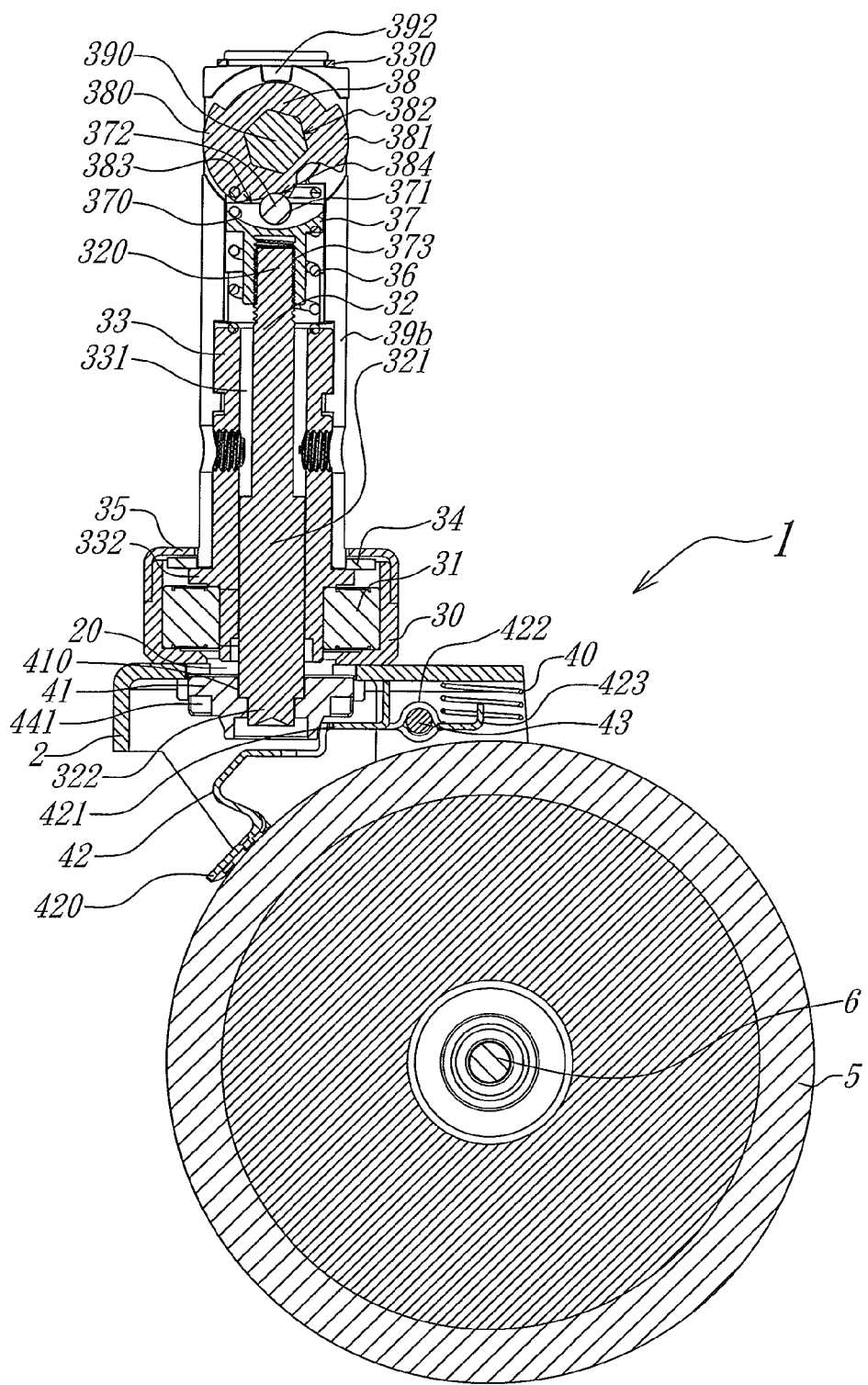
FIG. 5 is a side cross-sectional view of the castor as shown in FIG. 3.

Referring to the drawings and initially to FIGS. 3-5, a castor 1 in accordance with the preferred embodiment of the present invention comprises a castor body 2, an operation unit 3 connected with the castor body 2, a locking unit 4 connected with the castor body 2, a roller 5 mounted on the castor body 2, two caps 50 mounted on two opposite sides of the roller 5, a mandrel 6 extended through the castor body 2, the caps 50 and the roller 5, and a nut 7 locked onto the mandrel 6.

The castor body 2 has an interior provided with a chamber 20. The castor body 2 has two opposite sides each having an upper end provided with an aperture 21 and a lower end provided with a shaft hole 22 to allow passage of the mandrel 6. Each of the caps 50 is provided with a central hole 501 to allow passage of the mandrel 6. The roller 5 is provided with a central hole 51 to allow passage of the mandrel 6.

The operation unit 3 includes a housing 39, a support tube 33 mounted in the housing 39, a control shaft 32 mounted in the support tube 33, a slide 37 connected with an upper end of the control shaft 32, a first spring 36 mounted on the slide 37 and biased between the slide 37 and the support tube 33, a pressing member 372 mounted on a top of the slide 37, a cam block 38 located above the slide 37 and rotatable to press the slide 37, an operation handle 390 extended through the housing 39 and the cam block 38, a bearing race 30 mounted on a top of the castor body 2 and locked in the chamber 20 of the castor body 2, a bearing 31 mounted in the bearing race 30, a bearing cover 35 mounted on the support tube 33 and connected with the bearing race 30, and a washer 34 mounted on the support tube 33 and located in the bearing cover 35.

The housing 39 includes two shells 39a and 39b which are combined together and encircle the support tube 33. The shells 39a and 39b of the housing 39 are combined together by a C-shaped snap ring 330 which is snapped onto the top of each of the shells 39a and 39b. The housing 39 has an upper end provided with two through holes 391a and 391b and a lower end provided with two first bores 394a and 394b. The housing 39 has an inner face provided with a limit projection 392.

The support tube 33 has an interior provided with a slideway 331 and has a periphery provided with two second bores 333. The operation unit 3 further includes two locating pins 393 extended through the first bores 394a and 394b of the housing 39 and the second bores 333 of the support tube 33 to combine the housing 39 with the support tube 33. The support tube 33 has a lower end provided with a flange 332 located under the second bores 333, and the washer 34 abuts the top of the flange 332 of the support tube 33.

The control shaft 32 is movably mounted in the slideway 331 of the support tube 33. The upper end of the control shaft 32 protrudes outward from the slideway 331 of the support tube 33 and has a threaded section 320. The control shaft 32 has a lower end extended into the chamber 20 of the castor body 2 and connected with the locking unit 4. The lower end of the control shaft 32 is provided with a hexagonal driving portion 321 which has a bottom provided with a reduced section 322.

The slide 37 has a substantially T-shaped profile and has an interior provided with a threaded hole 373 screwed onto the threaded section 320 of the control shaft 32 so that the slide 37 is combined with the control shaft 32. The top of the slide 37 is provided with a transverse arcuate channel 370 which has a center provided with a longitudinal recess 371 to receive the pressing member 372. The bearing 31 is located between the bearing race 30 and the support tube 33. The first spring 36 is mounted on a lower end of the slide 37.

The cam block 38 is rotatably mounted in the housing 39 and has an interior provided with a hexagonal fixing hole 382 which is fixed on the operation handle 390 so that the cam block 38 is rotatable in concert with the operation handle 390. The cam block 38 has a first side provided with a first ear 380 and a second side provided with a second ear 381. The cam block 38 has a periphery provided with a plane 383, a shallow arcuate groove 384 and a deep arcuate groove 385 arranged between the first ear 380 and the second ear 381. The plane 383 is located between the first ear 380 and the shallow arcuate groove 384. The shallow arcuate groove 384 is located between the plane 383 and the deep arcuate groove 385. The deep arcuate groove 385 is located between the shallow arcuate groove 384 and the second ear 381. The first ear 380 and the second ear 381 of the cam block 38 are movable respectively to abut the limit projection 392 of the housing 39, with the limit projection 392 of the housing 39 being disposed between the first ear 380 and the second ear 381 of the cam block 38. As shown in FIG. 5, the shallow arcuate groove 384 of the cam block 38 receives the pressing member 372 at a normal state. The operation handle 390 has a hexagonal shape and is extended through the through holes 391a and 391b of the housing 39 and the fixing hole 382 of the cam block 38.

The locking unit 4 includes an elastic braking plate 42 mounted on the castor body 2, a rivet 43 extended through the castor body 2 and the elastic braking plate 42, a brake stop block 41 mounted on the control shaft 32 and movable to abut the elastic braking plate 42, and a second spring 40 biased between the castor body 2 and the elastic braking plate 42.

The elastic braking plate 42 has a first end provided with a braking portion 420 and a second end provided with a mounting portion 423 for mounting the second spring 40. The braking portion 420 of the elastic braking plate 42 is movable to press the roller 5. The elastic braking plate 42 has a mediate position provided with a pivot portion 422 mounted on the rivet 43. The pivot portion 422 of the elastic braking plate 42 is located between the braking portion 420 and the mounting portion 423. The elastic braking plate 42 has a side provided with a plurality of locking teeth 421. The locking teeth 421 of the elastic braking plate 42 are located between the braking portion 420 and the pivot portion 422 and are arranged in an arcuate manner.

The rivet 43 is extended through the aperture 21 of each of the two opposite sides of the castor body 2 and the pivot portion 422 of the elastic braking plate 42.

The second spring 40 is mounted on the mounting portion 423 of the elastic braking plate 42.

The brake stop block 41 has a center provided with a hexagonal driven hole 410 secured on the driving portion 321 of the control shaft 32 so that the brake stop block 41 is movable upward and downward in concert with the control shaft 32. The brake stop block 41 is movable upward to abut the castor body 2 to stop rotation of the control shaft 32. The brake stop block 41 is located above the elastic braking plate 42 and has a bottom provided with a plurality of toothed grooves 411. The toothed grooves 411 of the brake stop block 41 are arranged in an annular manner and are movable downward to engage the locking teeth 421 of the elastic braking plate 42 to stop rotation of the control shaft 32. When the brake stop block 41 is movable downward to abut the elastic braking plate 42, the braking portion 420 of the elastic braking plate 42 is movable downward to press the roller 5 to stop rolling of the roller 5.

Figure 6:
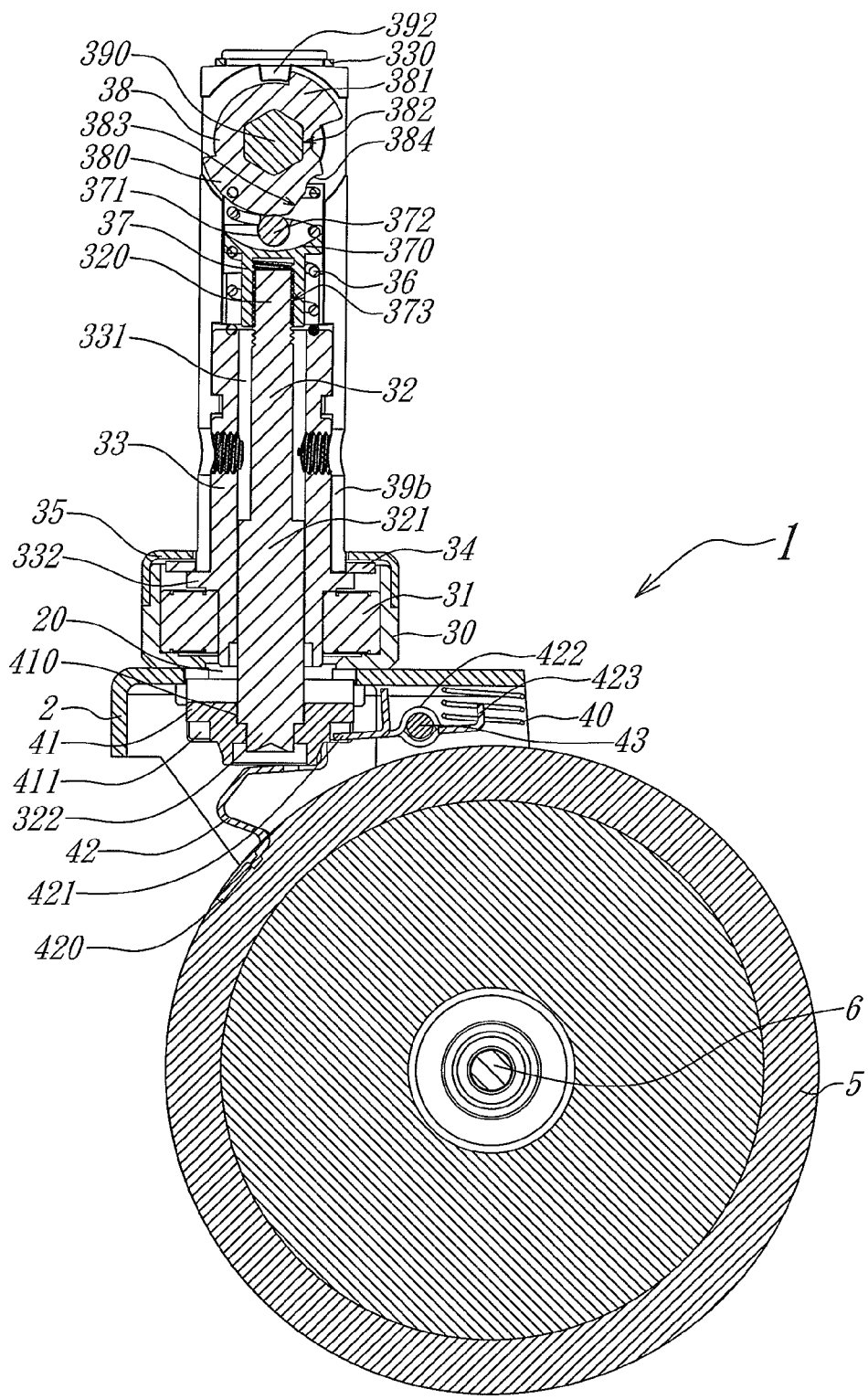
FIG. 6 is a schematic operational view of the castor as shown in FIG. 5.
Figure 7:
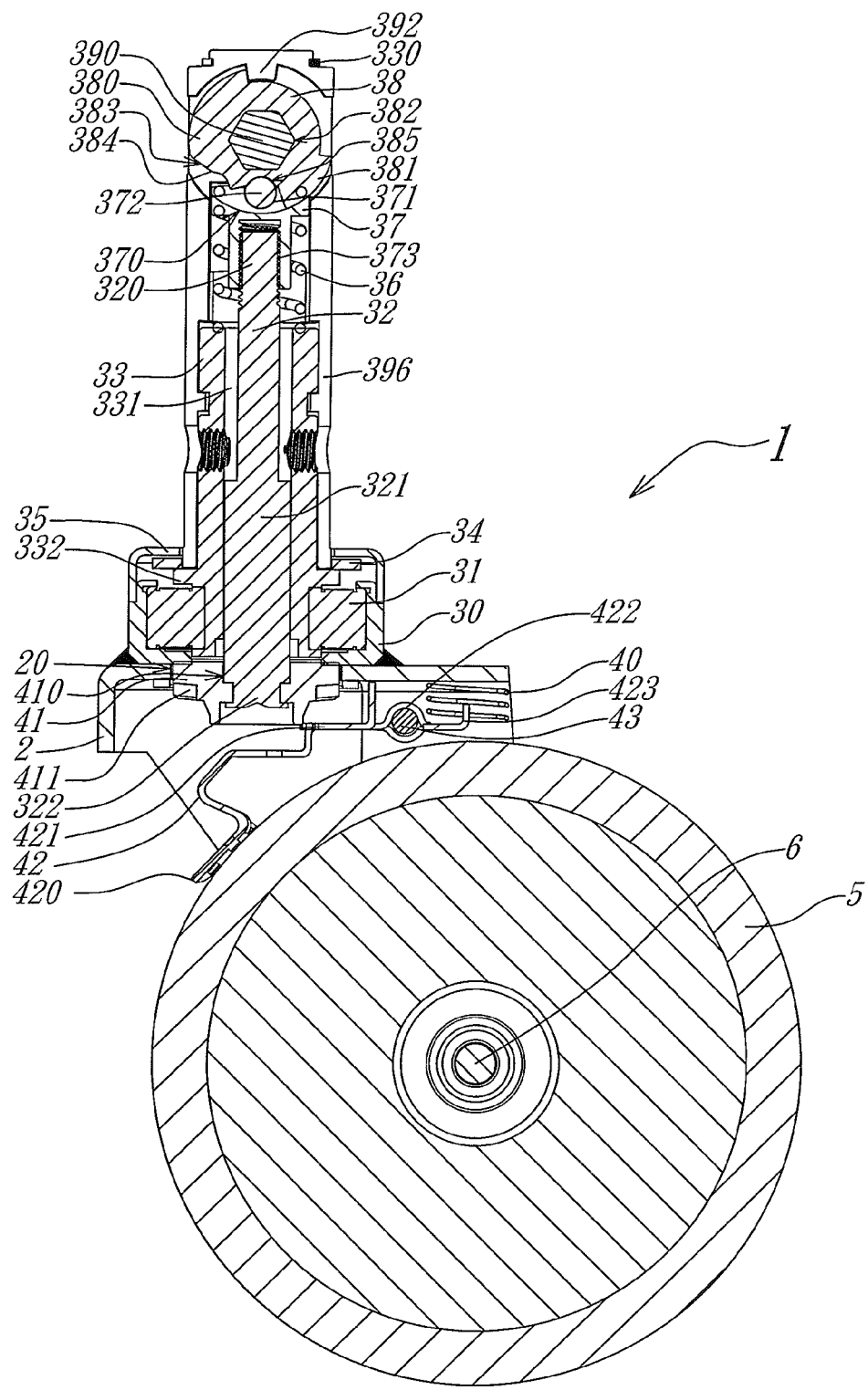
FIG. 7 is a schematic operational view of the castor as shown in FIG. 5.

In operation, referring to FIGS. 6 and 7 with reference to FIGS. 3-5, when the cam block 38 is rotated by the operation handle 390 in a first direction, for example, in the counter-clockwise direction as shown in FIG. 5, the first ear 380 of the cam block 38 is moved to push downward the pressing member 372 which presses the slide 37 which compresses the first spring 36 and pushes the control shaft 32 which drives the brake stop block 41 so that the brake stop block 41 is moved downward to press the elastic braking plate 42. In such a manner, the braking portion 420 of the elastic braking plate 42 is moved downward to press the roller 5 as shown in FIG. 6 so as to stop rolling and translation of the roller 5, while the mounting portion 423 of the elastic braking plate 42 is moved upward to compress the second spring 40. At the same time, the toothed grooves 411 of the brake stop block 41 are moved downward to engage the locking teeth 421 of the elastic braking plate 42 as shown in FIG. 6 to stop rotation of the control shaft 32 so that the roller 5 cannot be rotated. Thus, the roller 5 cannot roll and translate and cannot be rotated. When the cam block 38 is further rotated, the second ear 381 of the cam block 38 is moved to abut the limit projection 392 of the housing 39 as shown in FIG. 6 so as to stop rotation of the cam block 38. When the cam block 38 is rotated reversely from the position as shown in FIG. 6 to the position as shown in FIG. 5, the slide 37, the control shaft 32 and the brake stop block 41 are returned to the original position by the restoring force of the first spring 36 and the second spring 40.

On the contrary, when the cam block 38 is rotated by the operation handle 390 in a second direction, for example, in the clockwise direction as shown in FIG. 5, the deep arcuate groove 385 of the cam block 38 receives the pressing member 372 as shown in FIG. 6. In such a manner, the slide 37 and the control shaft 32 are pushed and moved upward by the restoring force of the first spring 36, so that the brake stop block 41 is moved upward to abut the castor body 2 to stop rotation of the control shaft 32. At this time, the toothed grooves 411 of the brake stop block 41 disengage the locking teeth 421 of the elastic braking plate 42 as shown in FIG. 7 so that the roller 5 can roll and translate. Thus, the roller 5 cannot be rotated but can roll and translate freely.

Accordingly, when the castor 1 is locked completely, the roller 5 is entirely locked by the locking unit 4 so that the roller 5 cannot roll and translate and cannot be turned around simultaneously so as to provide a double-braking effect. In addition, when the castor 1 is locked partially, the roller 5 is partially locked by the locking unit 4 so that the roller 5 cannot be turned around but can roll and translate freely.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor comprising:
a castor body;
an operation unit connected with the castor body;
a locking unit connected with the castor body;
a roller mounted on the castor body; and
a mandrel extended through the castor body and the roller:
wherein:
the castor body has an interior provided with a chamber;
the operation unit includes:
a housing;
a support tube mounted in the housing;
a control shaft mounted in the support tube;
a slide connected with an upper end of the control shaft;
a first spring mounted on the slide and biased between the slide and the support tube;
a pressing member mounted on a top of the slide;
a cam block located above the slide and rotatable to press the slide; and
an operation handle extended through the housing and the cam block;
the control shaft has a lower end extended into the chamber of the castor body and provided with a driving portion;
the locking unit includes:
an elastic braking plate mounted on the castor body;
a rivet extended through the castor body and the elastic braking plate;
a brake stop block mounted on the control shaft and movable to abut the elastic braking plate; and
a second spring biased between the castor body and the elastic braking plate;
the elastic braking plate has a first end provided with a braking portion and a second end provided with a mounting portion for mounting the second spring;
the elastic braking plate is provided with a pivot portion mounted on the rivet;
the elastic braking plate has a side provided with a plurality of locking teeth;
the brake stop block has a center provided with a driven hole secured on the driving portion of the control shaft; and
the brake stop block is located above the elastic braking plate and has a bottom provided with a plurality of toothed grooves.

2. The castor of claim 1, wherein:
the braking portion of the elastic braking plate is movable to press the roller; and
the toothed grooves of the brake stop block are movable to engage the locking teeth of the elastic braking plate to stop rotation of the control shaft.

3. The castor of claim 1, wherein the brake stop block is movable upward to abut the castor body to stop rotation of the control shaft.

4. The castor of claim 1, wherein:
the pivot portion of the elastic braking plate is located between the braking portion and the mounting portion; and
the locking teeth of the elastic braking plate are located between the braking portion and the pivot portion.

5. The castor of claim 1, wherein:
the castor body has two opposite sides each having an upper end provided with an aperture; and
the rivet is extended through the aperture of each of the two opposite sides of the castor body and the pivot portion of the elastic braking plate.

6. The castor of claim 1, wherein the second spring is mounted on the mounting portion of the elastic braking plate.

7. The castor of claim 1, wherein:
the housing includes two shells which are combined together and encircle the support tube;
the housing has an upper end provided with two through holes and a lower end provided with two first bores;
the support tube has an interior provided with a slideway and has a periphery provided with two second bores;
the operation unit further includes two locating pins extended through the first bores of the housing and the second bores of the support tube;
the control shaft is movably mounted in the slideway of the support tube;

the upper end of the control shaft protrudes outward from the slideway of the support tube;

the top of the slide is provided with a recess to receive the pressing member;

the cam block is rotatably mounted in the housing and has an interior provided with a fixing hole; and the operation handle is extended through the through holes of the housing and the fixing hole of the cam block.

\* \* \* \* \*